April 26, 1932.  J. E. ATWOOD  1,855,661
TURPENTINE CUP
Filed June 13, 1929
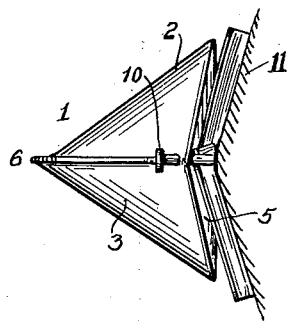
Fig.2.
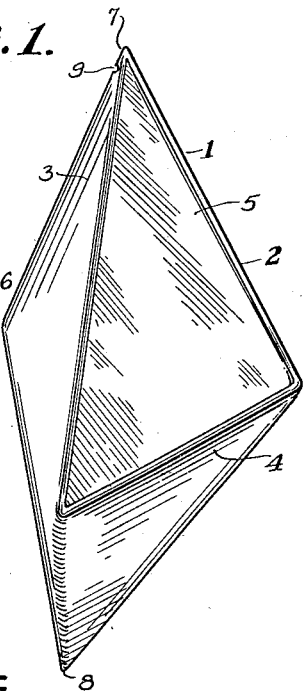
Fig.1.
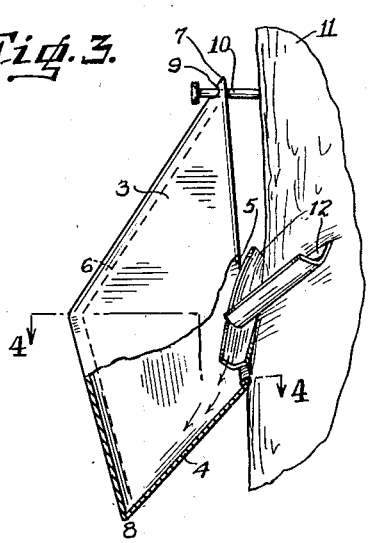
Fig.3.
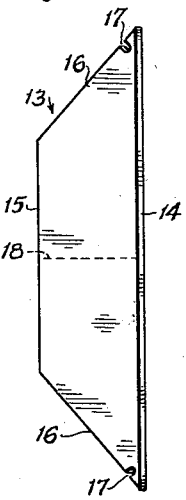
Fig.5.
Fig.6.
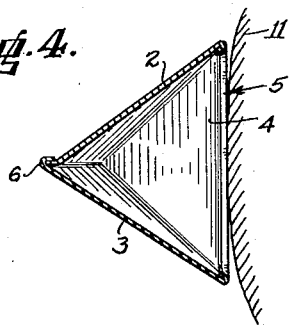
Fig.4.
Inventor
Jules E. Atwood
By Mason Fenwick & Lawrence
Attorneys Patented Apr. 26, 1932

1,855,661

UNITED STATES PATENT OFFICE

JULES EPPING ATWOOD, OF DARIEN, GEORGIA

TURPENTINE CUP

Application filed June 13, 1929. Serial No. 370,499.

This invention relates to a gum cup, and more specifically, a covered cup suitable for collecting the gum free from leaves, chips, rain water and other débris, as well as the rays of the sun.

The principal object is to provide a gum cup, with a hood or cover, which may be made out of a single blank of material preferably of sheet metal. At the present time, the cup most universally used is uncovered, with the result that falling leaves, chips from fresh streaks cut to draw the gum, and rain water fall into the cup, mixing with the gum, and to remove the same causes great loss of turpentine and rosin. Further, a great deal of gum is lost by evaporation due to the cups being uncovered. Cattle knock down the cups while attempting to drink water that collects in them, and men are paid extra to carry paddles, which are held over cups, while streaking, to prevent the chips from falling into them.

Another object is to provide a cup with a low center of gravity, so that the cup will always hang in the proper relation to the troughs. The present cups often hang out of alinement, causing the contents of the same to be wasted.

Another object is to provide a gum cup which may be manufactured very cheaply and which will be far superior to the present cups in use.

Other objects will be disclosed and shown in the specification and drawings.

Referring to the drawings:

Figure 1 is a perspective of the cup in assembled form;

Figure 2 is a top plan of the cup shown in position on the tree;

Figure 3 is a side elevation with a portion of the cup broken away showing the cup in position as actually used;

Figure 4 is a section taken on the line 4—4 of Figure 3;

Figure 5 is a cup in blank form; and

Figure 6 is the blank shown in Figure 5 in folded position.

In the drawings, in which like numerals designate similar parts:

Numeral 1 refers to a gum cup having sides 2, 3 and 4 which form an opening 5 of substantially triangular formation. A seam 6 extends from the top corner 7 to the bottom-most point 8. An opening 9 is formed adjacent the top corner 7 to receive a nail 10 to suspend the cup 1 from the tree 11. The usual troughs 12, as shown in Figure 3, are utilized to collect the gum from the tree.

It will be noted that the structure above described when positioned on a tree constitutes an upper hood portion and a lower bowl portion. The open face 5 of the hood is adapted to extend close to the tree and prevent water, insects and other foreign substance entering the bowl, the side 4 engaging the tree and forming a fulcrum for the bowl portion which is inclined at an angle away from the tree. It will be noted that the lateral edges of the open face 5 of the hood, when in position, extend parallel with and in contact with the tree, as illustrated by Figure 3.

The cup 1 as illustrated is formed from a blank 13 preferably of sheet metal which is a substantial trapezoid, as shown in Figure 5, having a long side 14, a short parallel side 15 and two sides 16 of the same length. At the opposite ends of the side 15 in the sides 16 are formed indentations 17. In order to form the cup 1, the blank 13 is folded along a line 18 so that the two sides 16 will substantially coincide with each other, leaving a slight overhang in the form of a flange 19. The flange 19, as shown in Figure 6, is turned over the opposite sides 15 and the proposed edge parts of side 16 are folded over so as to secure the blank 13 in folded position. In this position, the sides of the blank are closely adjacent each other, and the blank 13 has now assumed a trapezoid of half the length of the blank, as shown in Figure 5.

The side formed by folding along line 18 is forced outwardly along lines 20 and 21, as shown in dotted lines in Figure 6, so that the blank assumes the form shown in Figure 1. The indentations 17 are overlapped in the folding process so as to form the opening 9.

As actually used, gashes will be cut in the tree 11 and troughs 12 placed therein to collect the gum. The cup 1 will then be placed over the troughs 12 so that the bottom 8 forming the collecting bowl will be beneath the troughs 12. A nail 10 is then driven through the opening 9, so as to secure the cup 1 in position.

It is apparent that a cup is provided which will protect the gum from foreign substances of all sorts, including rain, and to a large extent the evaporation caused by the sun beating down on the unprotected gum.

My invention fulfills a long felt want in that it can be very quickly and easily manufactured, and at the same time, provides an adequate protection against the elements, and presents a cup so designed as to always hang suspended in alinement with the tree and troughs so as to prevent the spilling of the contents.

It will be noted that the edge of side 4 will contact with the tree below the troughs 12, and since the gum will collect at point 8 first, the edge of side 4 will act as a fulcrum pulling the top corner 7 away from the tree trunk, leaving a free unobstructed passage for the flow of gum.

Obviously this can be controlled and adjusted by the depth to which the securing nail 10 is driven into the tree and may be entirely eliminated in this manner, if desired.

What I claim is:

1. A cup for collecting sap from trees having an open side with a bottom extending downward from said open side and sides joined at rear and top edges to define with the bottom said open side, means in the top portion of said cup for suspending said cup from the tree so that the open face of said cup is adapted to contact with said tree.

2. A cup for collecting sap from trees, having an open side with a bottom extending downwardly from said open side to form a compartment of less diameter than the upper portion of the bottom and sides, joined at rear and top edges to define with the bottom said open side, means in the top portion of said cup for suspending said cup from a tree so that the open face of said cup is adapted to contact with said tree.

3. A cup for collecting sap from trees, having an open side with a bottom extending downwardly in a substantial point from said open side and sides joined at rear and top edges to define with the bottom said open side, means in the top portion of said cup for suspending said cup from a tree so that the open face of said cup is adapted to contact with said tree and the pointed end align the rest of the cup in a vertical line.

4. A sap cup comprising a container adapted to be suspended from a tree at a point above its centre of gravity, said container having a bowl and hood, the latter having an open face, the lateral edges of which are adapted to extend close to the tree and the lower edge of which engages the tree when the cup is suspended, the lower edge of the open face lying beyond the vertical line through the point of suspension, whereby the center of mass of said cup is pushed away from the vertical by the lateral engagement of said cup with the tree, biasing the cup forcibly against the tree.

5. A sap cup comprising a container adapted to be dependingly supported against a tree at a point above its center of gravity, said container having one face open from an intermediate point to the point of suspension and the lower edge of said open face engageable with said tree, the lateral edges of said open face lying substantially in a plane inclined from the vertical from the point of suspension to the engaging edge whereby when suspended on and supported by a tree, the center of mass of the cup is pushed beyond the vertical biasing the cup forcibly against the tree, the plane of the open face being brought parallel to the tree with the lateral edges against the tree.

6. A cup having a bottom of substantially triangular shape and two sides extending from two sides of the bottom and meeting in a back edge extending upwardly from the included apex of the bottom and also meeting in a top edge extending from the top of the back edge upwardly and forwardly to form a point above and substantially medial of the front side of the bottom.

7. A cup having a bottom of substantially triangular shape, two sides meeting in a back edge which extends upwardly from an apex of the bottom and also meeting in a top edge which extends upwardly and forwardly from the top of said back edge above and substantially medial of the side of the bottom opposite said apex.

In testimony whereof I affix my signature.

JULES EPPING ATWOOD.